(12) United States Patent
Liao

(10) Patent No.: US 11,325,668 B2
(45) Date of Patent: May 10, 2022

(54) ADJUSTABLE SHOCK-ABSORBING SEAT TUBE

(71) Applicant: HSIN LUNG ACCESSORIES CO., LTD., Hsin-Chu Hsien (TW)

(72) Inventor: Xue-Sen Liao, Hsin-Chu Hsien (TW)

(73) Assignee: HSIN LUNG ACCESSORIES CO., LTD., Hsien (TW)

( * ) Notice: Subject to any disclaimer, the term of this patent is extended or adjusted under 35 U.S.C. 154(b) by 15 days.

(21) Appl. No.: 17/134,651

(22) Filed: Dec. 28, 2020

(65) Prior Publication Data

US 2021/0214031 A1    Jul. 15, 2021

(30) Foreign Application Priority Data

Jan. 10, 2020 (TW) ................. 109200449

(51) Int. Cl.
*B62J 1/08* (2006.01)
*B62J 1/06* (2006.01)

(52) U.S. Cl.
CPC . *B62J 1/06* (2013.01); *B62J 1/08* (2013.01); *B62J 2001/085* (2013.01)

(58) Field of Classification Search
CPC ............................. B62J 2001/085; B62J 1/02
USPC ..................................... 403/109.7
See application file for complete search history.

(56) References Cited

U.S. PATENT DOCUMENTS

| 2018/0134337 | A1* | 5/2018 | Holtzman | F16B 7/105 |
| 2019/0233041 | A1* | 8/2019 | Watson | B62J 1/08 |
| 2019/0300084 | A1* | 10/2019 | Ahnert | B62J 1/065 |
| 2019/0316649 | A1* | 10/2019 | Chen | B62K 21/02 |

FOREIGN PATENT DOCUMENTS

| CH | 716006 A2 | * | 9/2020 | ............... B62J 1/08 |
| CN | 2182121 Y | * | 11/1994 | |
| CN | 2199115 Y | * | 5/1995 | |
| CN | 111605647 A | * | 9/2020 | ............... B62J 1/02 |
| CN | 113264131 A | * | 8/2021 | |
| DE | 102019006320 B3 | * | 10/2020 | |
| DE | 202020107502 U1 | * | 3/2021 | ............... B62J 1/06 |
| EP | 3441292 A1 | * | 2/2019 | ............... B62J 1/06 |
| GB | 2284395 A | * | 6/1995 | ............... B62J 1/02 |
| KR | 20170093344 A | * | 8/2017 | |
| KR | 102291345 B1 | * | 8/2021 | |
| WO | WO-2021223022 A1 | * | 11/2021 | |

* cited by examiner

*Primary Examiner* — Timothy J Brindley
(74) *Attorney, Agent, or Firm* — Demian K. Jackson; Jackson IPG PLLC

(57) ABSTRACT

The invention relates to a shock-absorbing seat tube, including an outer tube and an inner tube sleeved within the outer tube. The inner tube is adapted for connection to a bicycle saddle from below through a joint. The seat tube is provided with a height adjustment device having a supporting end inserted into the inner tube, and a shock-absorbing device disposed in the inner tube at a position above the height adjustment device and includes a fixing part and a damper part. The fixing part passes at its top end through the inwardly protruded portion of the inner tube and is arranged in the barrel portion of the inner tube. The damper part is arranged between the inwardly protruded portion and the supporting end.

16 Claims, 6 Drawing Sheets

ADJUSTABLE SHOCK-ABSORBING SEAT TUBE

PRIORITY CLAIM

This application claims priority to R.O.C. Utility Model Application No. 109200449 filed Jan. 10, 2020, the entirety of which is incorporated herein by reference.

FIELD OF THE INVENTION

This invention is related to a shock-absorbing seat tube with a height adjustment function.

BACKGROUND OF THE INVENTION

Bicycles are common modern leisure and exercise equipment, and the distance and time that modern people ride are gradually elongated with the increasing need of exercise. Generally, a bicycle saddle is disposed on the rear section of the frame through a seat tube, and a height adjustment device is mounted on the seat tube to adjust the height of the saddle to suit different riders. The height adjustment device is arranged between the seat tube and the seat post and actuated by linear displacement to change the relative position of the seat tube and the seat post, thereby achieving the height adjustment. The height adjustment devices of this kind can be roughly divided into "mechanical", "pneumatic-hydraulic" and "hybrid" types, depending on the way that they operate. The "mechanical" type employs certain mechanical parts which cooperate to adjusts the relative position of the seat tube and the seat post. The "pneumatic-hydraulic" type involves using a pneumatic part, a hydraulic part, or both, to adjust the relative position of the seat tube and the seat post. The "hybrid" type combines the "mechanical" type with the "pneumatic-hydraulic" type to adjust the relative position of the seat tube and the seat post.

However, while the "mechanical type", "pneumatic-hydraulic type" and "hybrid type" height adjustment devices described above are useful for adjusting the length of the seat tube at a controlled rate, the conventional seat tube cannot provide shock absorption. As a result, the rider often feels uncomfortable due to the vibration of the bicycle frame passing through the saddle and the seat tube, which is not conducive to long-term riding. Therefore, considerable improvements need to be made to the bicycle seat tube.

SUMMARY OF THE INVENTION

In one aspect provided herein is a seat tube structure, especially a shock-absorbing seat tube with a height adjustment function.

The adjustable shock-absorbing seat tube disclosed herein includes an inner tube and an outer tube sleeved on the inner tube. The inner tube is adapted for connection at one end to a bicycle saddle from below through a joint, and sleeved at the other end within the outer tube. The outer tube is connected at its bottom end to a bicycle frame. The outer tube is provided inside with a height adjustment device which is fixed at one end and configured at the opposite end with a supporting end inserted into the inner tube. The inner tube is provided inside with a shock-absorbing device at a position above the height adjustment device. The shock-absorbing device comprises a fixing part and a damper part, wherein the fixing part comprises a shaft body and a shaft head located at a top end of the shaft body and having a width greater than that of the shaft body. The inner tube comprises a barrel portion and an inwardly protruded portion formed in the barrel portion and surrounding a through hole that communicates with the barrel portion. The through hole allows the shaft body to pass therethrough and further allows the shaft head to be nested in the barrel portion, and wherein the damper part is arranged between the inwardly protruded portion and the supporting end.

In a preferred embodiment, the barrel portion has a width greater than that of the through hole, and the width of the through hole has a size between that of the shaft head and the shaft body.

In a preferred embodiment, the seat tube further comprises at least one washer mounted between the fixing part and the through hole.

According to the above technical feature, the seat tube further comprises a casing tube screwed at its top end to the inner tube, while the barrel portion and the through hole are formed on the casing tube.

In a preferred embodiment, the shaft body is fixed at its bottom end to the supporting end.

In a preferred embodiment, the damper part is configured as a compressed spring sleeved on the shaft body.

In a more preferred embodiment, the supporting end is formed with a recess for receiving and fixing the shaft body in position.

In a preferred embodiment, the height adjustment device comprises a cylinder, a piston rod axially displaceably arranged in the cylinder and a controller unit. The cylinder is formed at its top end with the supporting end inserted into the inner tube. The piston rod extends at its top end into the cylinder and is secured at its bottom end to a fixed cap fixed in the outer tube. The piston rod is connected to the controller unit, so that the piston rod is adapted for being pushed by the controller unit through manually triggering, thus opening a valve of the cylinder, resulting in an axial displacement of the piston rod relative to the cylinder.

In a preferred embodiment, the height adjustment device comprises either a pneumatic cylinder or a hydraulic cylinder.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The above and other objects, features and effects of the invention will become apparent with reference to the following description of the preferred embodiments.

Figure 1:
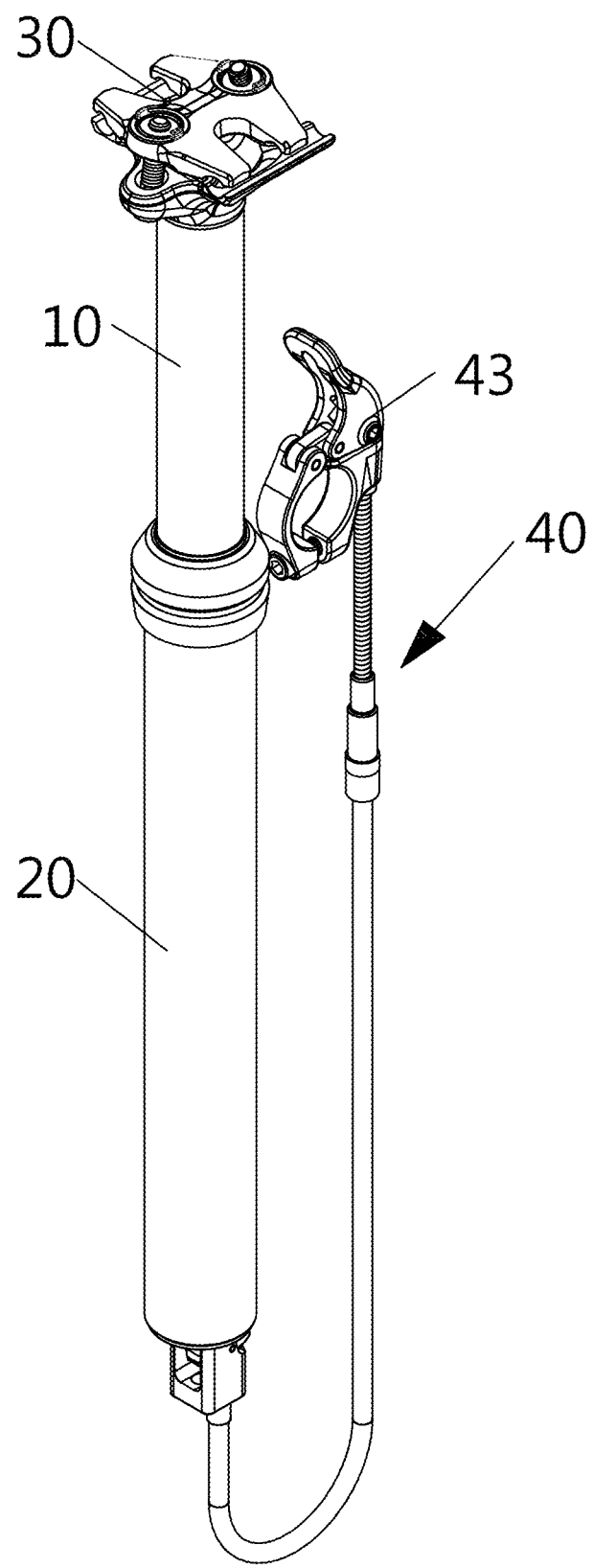
FIG. 1 is a perspective view of the shock-absorbing seat tube according to the invention.
Figure 2:
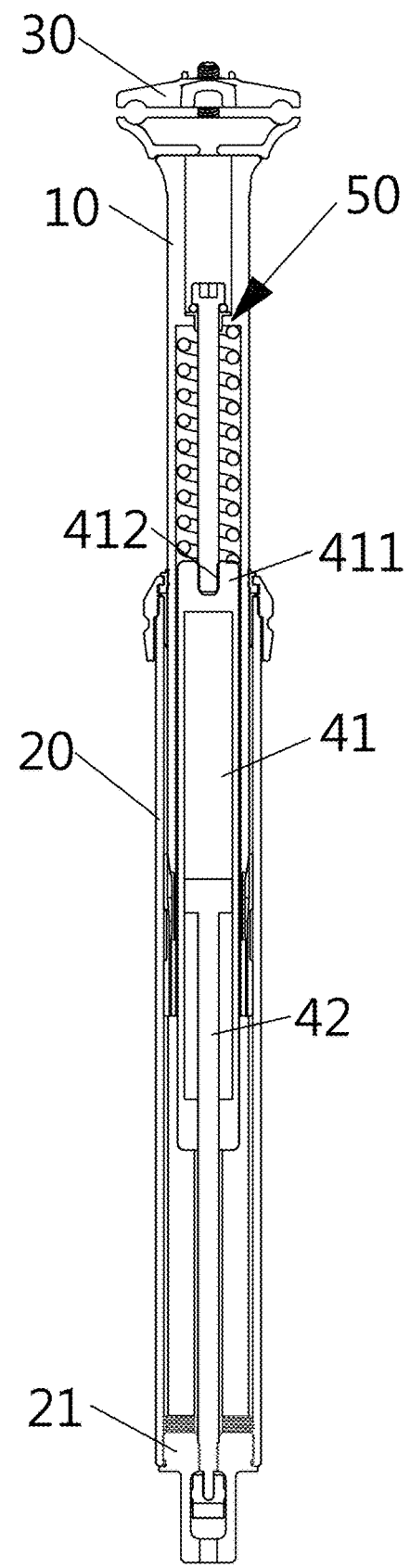
FIG. 2 is a schematic structural diagram of the shock-absorbing seat tube according to the first embodiment of the invention.

FIG. 1 is a perspective view of the shock-absorbing seat tube according to the invention, and FIG. 2 is a schematic cross-sectional view thereof. The shock-absorbing seat tube disclosed herein includes an inner tube 10 and an outer tube 20 sleeved thereon. The inner tube 10 is adapted for connection at one end to the bicycle saddle from below through a joint 30, and sleeved at the other end within the outer tube 20. The outer tube 20 is connected at its bottom end to the bicycle frame, and the seat tube is provided inside with a height adjustment device 40 and a shock-absorbing device 50.

The height adjustment device 40 may be a pneumatic cylinder or a hydraulic cylinder and disposed generally inside the outer tube 20. In this embodiment, a hydraulic cylinder is taken as an example, which includes a cylinder 41, a piston rod 42 axially displaceably arranged in the cylinder 41, and a controller unit 43. The cylinder 41 includes a top supporting end 411 inserted into the inner tube 10. The piston rod 42 extends at its top end into the cylinder 41 and is secured at its bottom end to a fixed cap 21 fixed in the outer tube 20, so that the piston rod 42 is fixed to be immobile. The piston rod 42 is connected to the controller unit 43, and the bottom end of the piston rod 42 can be pushed by the controller unit 43. As the piston rod 42 is linearly displaced, it causes the oil circuit in the cylinder 41 to be open, thus allowing the rider to adjust the height of the inner tube 10 through linear displacement of the inner tube 10 relative to the outer tube 20 according to his/her needs. When the inner tube 10 is adjusted to a proper height the rider may simply release the controller unit 43, causing a restoring elastic member (not shown in the figure) to push down the piston rod 42, thus forcing the oil circuit in the cylinder 41 to be closed, thereby positioning the inner tube 10 and completing adjustment of the height of the saddle. The controller unit 43 disclosed herein can be controlled by a control trigger mounted on the bicycle handlebar.

Figure 3:
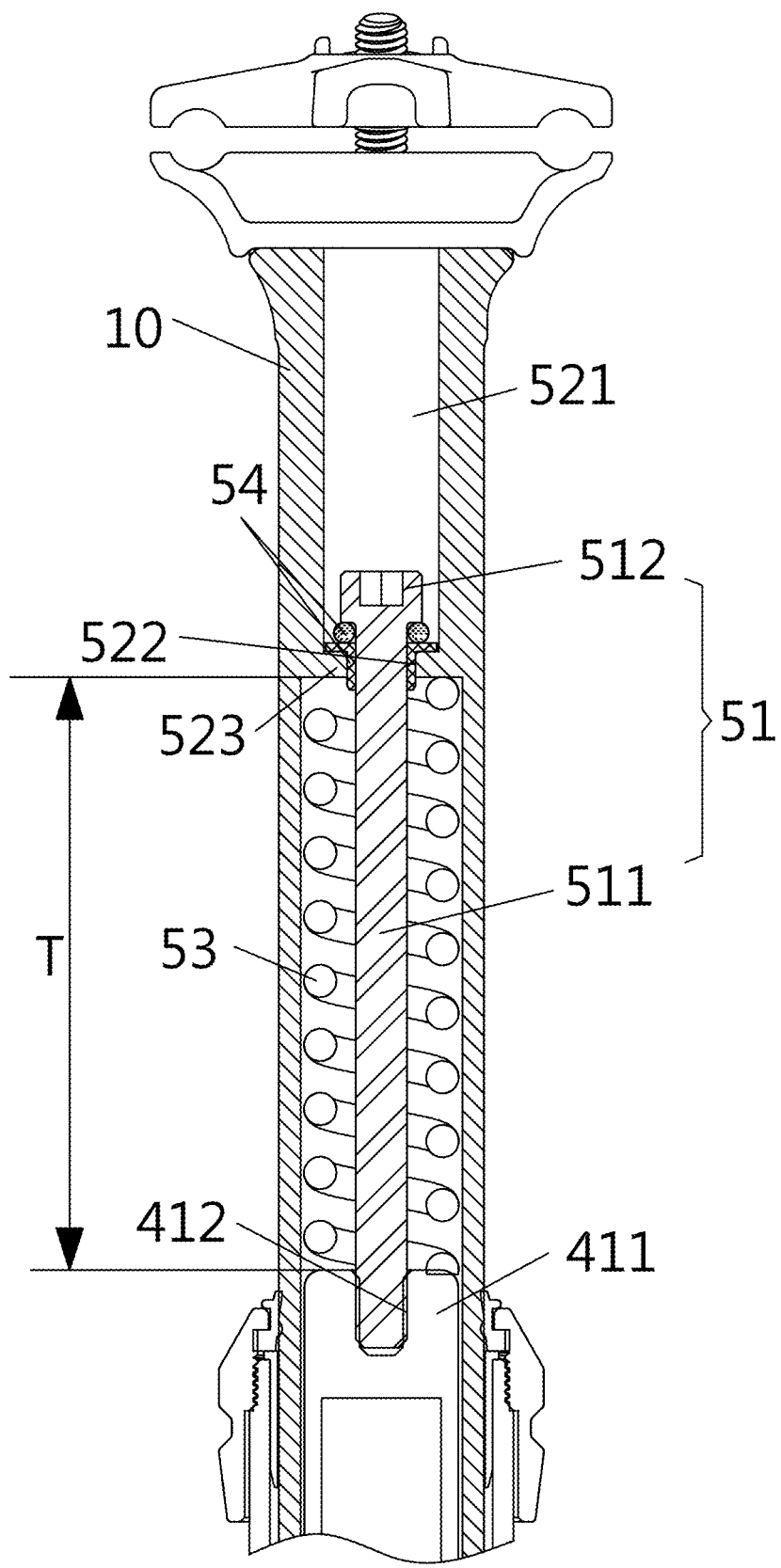
FIG. 3 is an enlarged schematic diagram showing a portion of the shock-absorbing seat tube according to the first embodiment of the invention.

The shock-absorbing device 50 is disposed within the inner tube 10 at a position above the height adjustment device 40. As shown in FIGS. 2 and 3, the shock-absorbing device 50 comprises a fixing part 51 and a damper part 53. The fixing part 51 has a shaft body 511 and a shaft head 512 located at the top end of the shaft body 511. The shaft head 512 has a width greater than that of the shaft body 511. The inner tube 10 includes a barrel portion 521 and an inwardly protruded portion 523 formed at an appropriate position in the barrel portion 521. The inwardly protruded portion 523 surrounds a through hole 522 that communicates with the barrel portion 521. The through hole 522 allows the shaft body 511 to pass therethrough and further allows the shaft head 512 to be nested in the barrel portion 521. The damper part 53 is arranged between the inwardly protruded portion 523 and the top supporting end 411 and may be configured in the form of a compressed spring or an elastic block. In this embodiment, the damper part 53 is illustrated by way of example as a compressed spring. The shaft body 511 is received at its bottom end by a recess 412 formed in the top supporting end 411, and the damper part 53 (illustrated as a compressed spring) is sleeved on the shaft body 511.

The barrel portion 521 has a width greater than the diameter of the through hole 522, and the diameter of the through hole 522 has a size between that of the shaft head 512 and the shaft body 511, so that the shaft head 512 is allowed to move reciprocally in the barrel portion 521 without passing through the through hole 522. At least one washer 54 may be mounted between the fixing part 51 and the through hole 522.

FIGS. 1 and 2 show the device assembled from the elements described above. The height adjustment device 40 is useful for adjusting the height of the bicycle saddle. When the controller unit 43 pushes the piston rod 42 upward, the oil circuit in the cylinder 41 is in an open state, and the inner tube 10 is linearly displaced relative to the outer tube 20, thereby adjusting the height of the saddle. After the adjustment, the controller unit 43 may be released to fix the height of the saddle.

Figure 4:
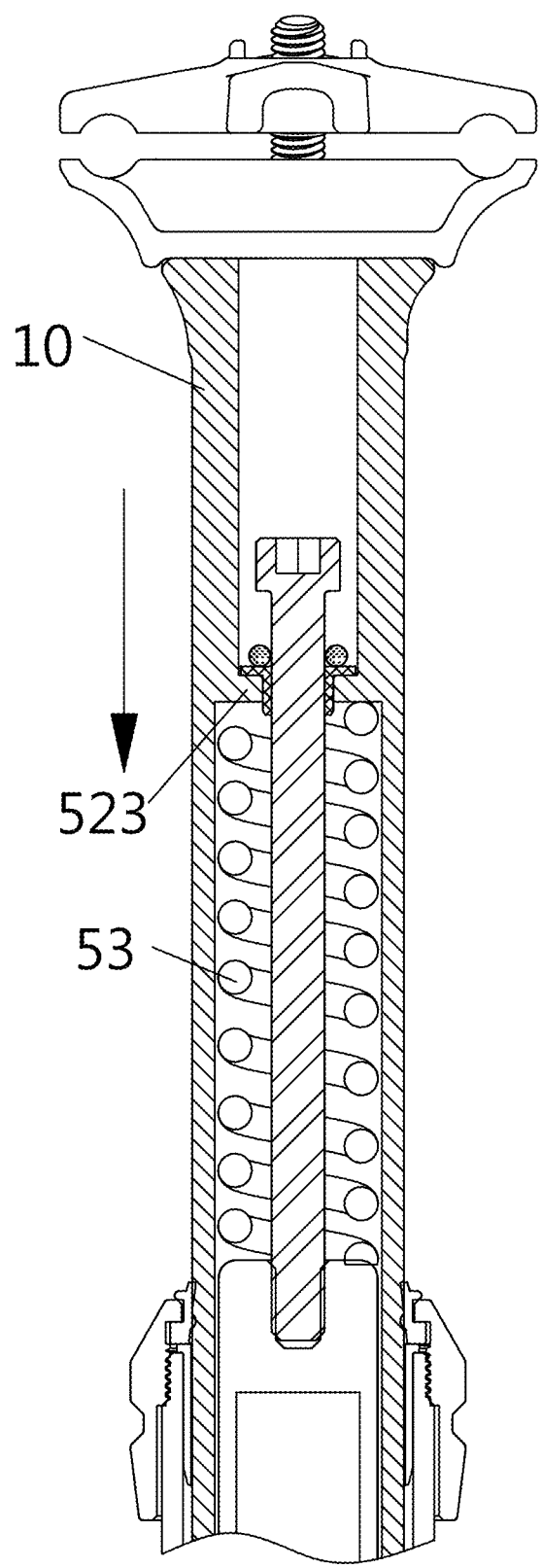
FIG. 4 is a schematic diagram of the shock-absorbing seat tube according the first embodiment of to the invention during its operation.

When the rider sits on the saddle (no matter when the saddle is just being seated or when the rider is riding on a bumpy road), the shock-absorbing device 50 is responsible for performing the shock-absorbing function, as shown in FIGS. 3 and 4. When the rider sits on the saddle or rides on a bumpy road, the inner tube 10 will move downwards axially due to the downward force applied by the rider. At this time, the inner tube 10 and the inwardly protruded portion 523 move downwardly, and the damper part 53 is compressed to perform a shock-absorbing effect on the saddle. In this embodiment, the distance between the inwardly protruded portion 523 and the top supporting end 411 is equal to the compression distance T of the damper part 53.

Figure 5:
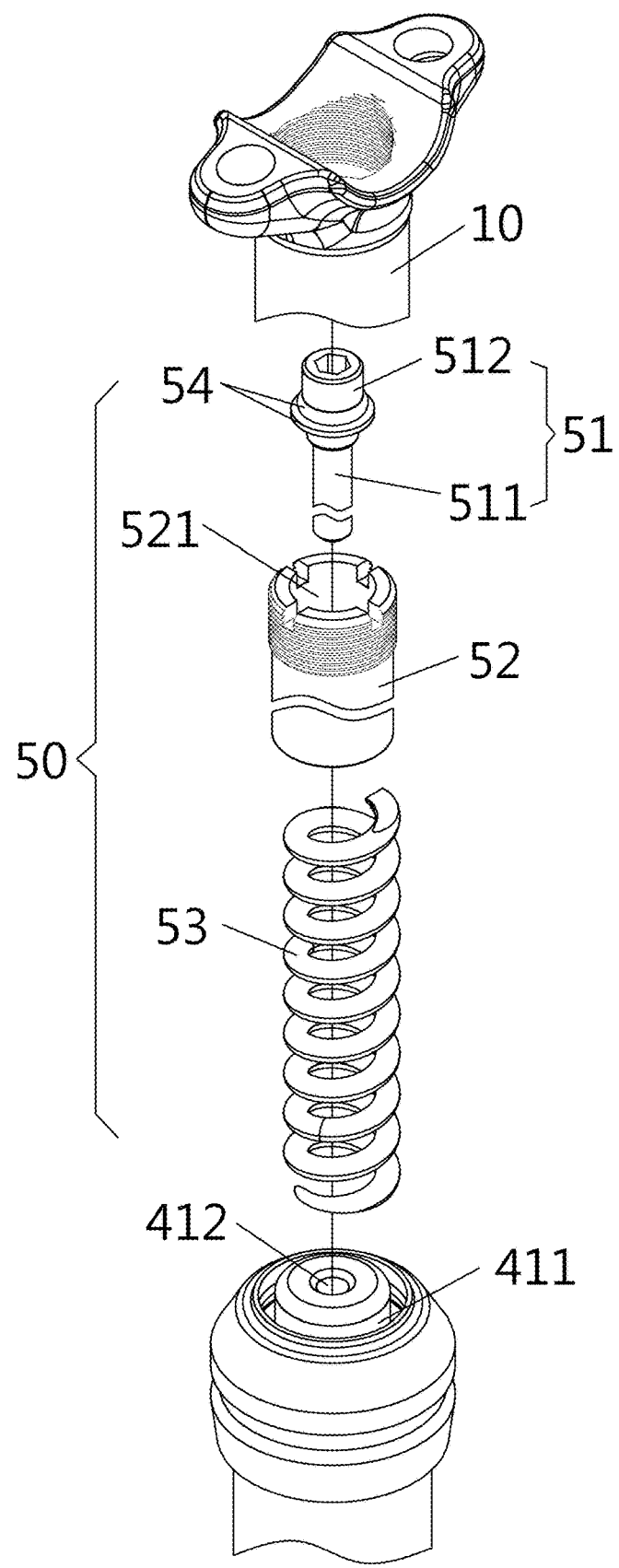
FIG. 5 is an exploded view of the shock-absorbing seat tube according to the second embodiment of the invention.
Figure 6:
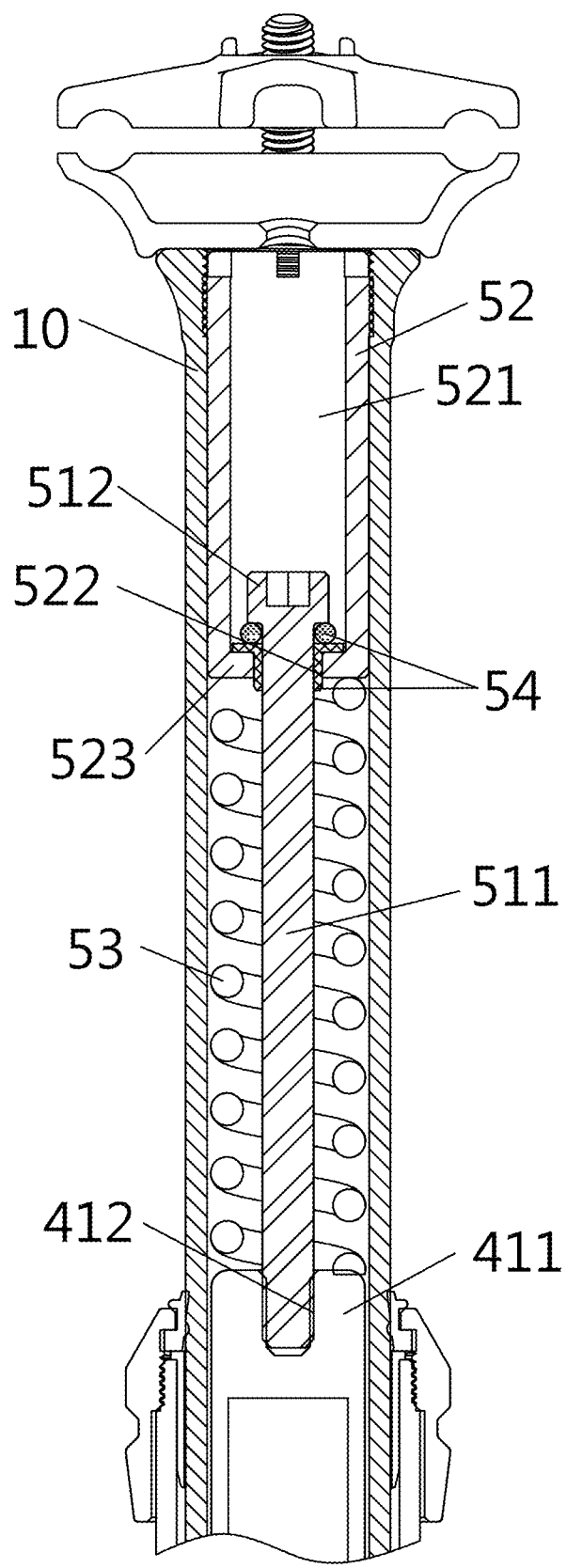
FIG. 6 is an enlarged schematic diagram showing a portion of the shock-absorbing seat tube according to the second embodiment of the invention.

Furthermore, in the second embodiment shown in FIGS. 5 and 6, the shock-absorbing device 50 further comprises a casing tube 52 screwed at its top end to the inner tube 10, while the barrel portion 521 and the through hole 522 are formed on the casing tube 52 and the inwardly protruded portion 523 is located at the bottom end of the casing tube 52. During use, the inwardly protruded portion 523 acts to abut downwards against the damper part 53, thus achieving a shock-absorbing effect.

The invention provides an improved height adjustable shock-absorbing seat tube. While the invention has been described with reference to the preferred embodiments above, it should be recognized that the preferred embodiments are given for the purpose of illustration only and are not intended to limit the scope of the present invention and that various modifications and changes, which will be apparent to those skilled in the relevant art, may be made without departing from the spirit and scope of the invention.

What is claimed is:

1. An adjustable shock-absorbing seat tube comprising:
   an outer tube connected at its bottom end to a bicycle frame;
   an inner tube adapted for connection at one end to a bicycle saddle from below through a joint and sleeved at the other end within the outer tube;
   a height adjustment device mounted in the outer tube, which is fixed at one end and configured at the opposite end with a supporting end inserted into the inner tube; and
   a shock-absorbing device mounted above the height adjustment device, wherein the shock-absorbing device comprises a fixing part and a damper part, the fixing part comprising a shaft body and a shaft head located at a top end of the shaft body and having a width greater than that of the shaft body, and wherein the inner tube comprises a barrel portion and an inwardly protruded portion formed in the barrel portion and surrounding a through hole that communicates with the barrel portion, and wherein the through hole allows the shaft body to pass therethrough and further allows the shaft head to be nested in the barrel portion, and wherein the damper part is arranged between the inwardly protruded portion and the supporting end.

2. The adjustable shock-absorbing seat tube according to claim 1, wherein the barrel portion has a width greater than that of the through hole, and the width of the through hole has a size between that of the shaft head and the shaft body.

3. The adjustable shock-absorbing seat tube according to claim 2, further comprising at least one washer mounted between the fixing part and the through hole.

4. The adjustable shock-absorbing seat tube according to claim 2, wherein the shaft body is fixed at its bottom end to the supporting end.

5. The adjustable shock-absorbing seat tube according to claim 4, wherein the damper part is configured as a compressed spring sleeved on the shaft body.

6. The adjustable shock-absorbing seat tube according to claim 4, wherein the supporting end is formed with a recess for receiving and fixing the shaft body in position.

7. The adjustable shock-absorbing seat tube according to claim 2, wherein the height adjustment device comprises a cylinder, a piston rod axially displaceably arranged in the cylinder and a controller unit, and wherein the cylinder is formed at its top end with the supporting end inserted into the inner tube, and wherein the piston rod extends at its top end into the cylinder and is secured at its bottom end to a fixed cap fixed in the outer tube, the piston rod being connected to the controller unit, so that the piston rod is adapted for being pushed by the controller unit through manually triggering, thus opening a valve of the cylinder, resulting in an axial displacement of the piston rod relative to the cylinder.

8. The adjustable shock-absorbing seat tube according to claim 2, wherein the height adjustment device comprises a pneumatic cylinder.

9. The adjustable shock-absorbing seat tube according to claim 2, wherein the height adjustment device comprises a hydraulic cylinder.

10. The adjustable shock-absorbing seat tube according to claim 2, further comprising a casing tube screwed at its top end to the inner tube, while the barrel portion and the through hole are formed on the casing tube.

11. The adjustable shock-absorbing seat tube according to claim 10, wherein the shaft body is fixed at its bottom end to the supporting end.

12. The adjustable shock-absorbing seat tube according to claim 11, wherein the damper part is configured as a compressed spring sleeved on the shaft body.

13. The adjustable shock-absorbing seat tube according to claim 11, wherein the supporting end is formed with a recess for receiving and fixing the shaft body in position.

14. The adjustable shock-absorbing seat tube according to claim 10, wherein the height adjustment device comprises a cylinder, a piston rod axially displaceably arranged in the cylinder and a controller unit, and wherein the cylinder is formed at its top end with the supporting end inserted into the inner tube, and wherein the piston rod extends at its top end into the cylinder and is secured at its bottom end to a fixed cap fixed in the outer tube, the piston rod being connected to the controller unit, so that the piston rod is adapted for being pushed by the controller unit through manually triggering, thus opening a valve of the cylinder, resulting in an axial displacement of the piston rod relative to the cylinder.

15. The adjustable shock-absorbing seat tube according to claim 10, wherein the height adjustment device comprises a pneumatic cylinder.

16. The adjustable shock-absorbing seat tube according to claim 10, wherein the height adjustment device comprises a hydraulic cylinder.

* * * * *